United States Patent Office 3,808,118
Patented Apr. 30, 1974

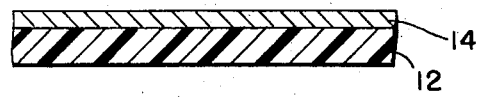
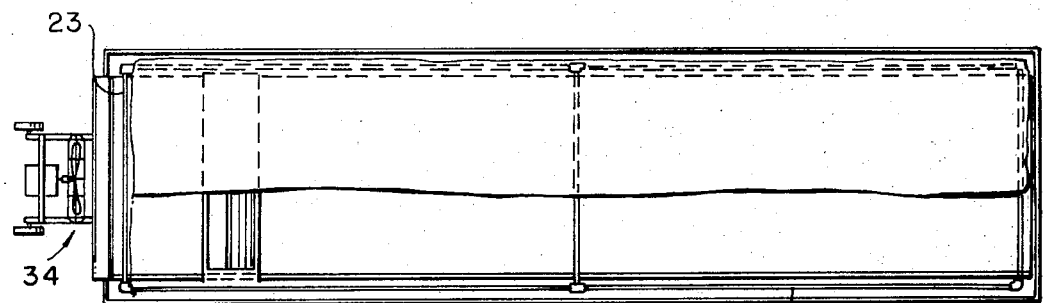
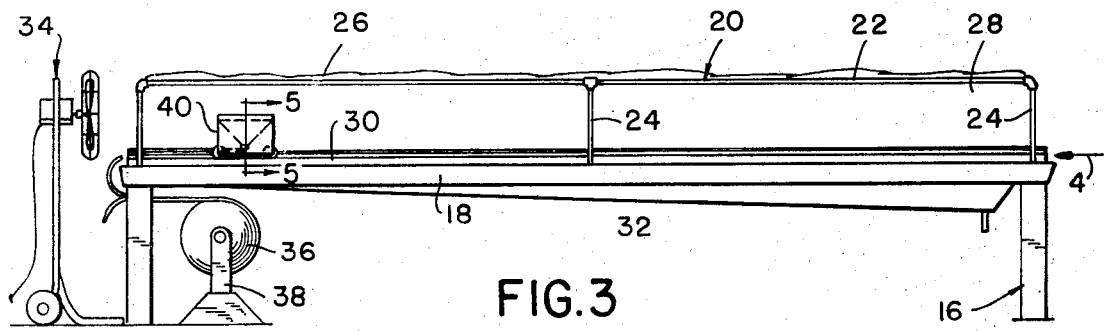
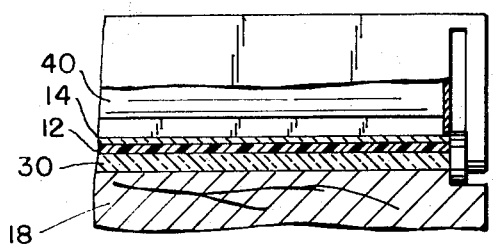
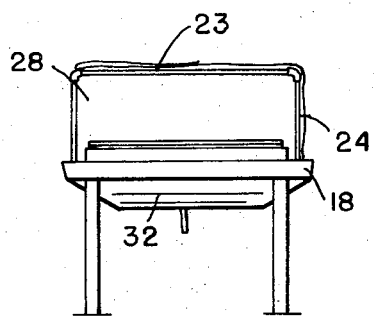

3,808,118
MICROPOROUS SUPPORT MEDIUM
Tipton L. Golias, Beaumont, Tex., assignor to Helena Laboratories Corporation, Beaumont, Tex.
Continuation-in-part of abandoned application Ser. No. 806,818, Mar. 13, 1969. This application July 1, 1971, Ser. No. 158,692
Int. Cl. B01k 5/00; B32b 5/18
U.S. Cl. 204—299                        8 Claims

ABSTRACT OF THE DISCLOSURE

The microporous support medium comprises a backing element made from a suitable material such as plastic, with the backing element having on one side thereof a homogeneous relatively brittle or fragile cellulose acetate film which adheres thereto and has an acetyl value of 20% to 44% inclusive.

This application is a continuation-in-part of my copending application Ser. No. 806,818 filed Mar. 13, 1969, now abandoned.

BACKGROUND OF THE INVENTION—FIELD

The microporous support medium of the present invention may be used in the field of zone electrophoresis and with other separation techniques including the field of thin layer chromatography. Zone electrophoresis is the science of moving charged particles in an electric field through a solid or semi-solid medium. The technique is most commonly used in medical research and medical laboratories for analyzing various blood proteins. Many types of support media have been used for zone electrophoresis including filter paper, agar gel, starch gel, acrylamide gel, silica gel, cellulose acetate powder, cellulose powder, and cellulose acetate membrane. Many of the prior art support media have been coated onto glass or plastic sheets to add extra resiliency to the support media and to make them easier to handle.

SUMMARY OF THE INVENTION

In accordance with the present invention a special type of cellulose acetate coated plastic material and the method of making same is disclosed. The support medium is a hypergel cellulose acetate having an acetyl value of 20% to 44% supported in its entirety by a backing element, as an example, by a relatively rigid plastic base. The preferred range for the acetyl value is 20% to 37%, although as indicated acetyl values up to as high as 44% are within the broad scope of my invention. The support medium when compared to prior art structures offers greatly improved resolution and exhibits easier handling characteristics. Separation time is approximately 20% less than that of commercially available cellulose acetate membranes and at least a 20% improved resolution is achieved under the same conditions. The support medium has excellent handling characteristics and the technician's time required per sample is reduced by approximately 50%.

This invention consists of a cellulose acetate coated backing element which uses one or more cellulose acetates having an average acetyl value of 20% to 44%. As already noted, the prefererd range for the acetyl value is 20% to 37%. The cellulose acetate is formed on the plastic or other material by a process described later. The advantage of this type of cellulose acetate product is that it absorbs more water and reaches a higher gel state than previously commercially available materials or products. The present invention yields both higher resolution and faster separations, both of which are very important in electrophoresis. The cellulose acetate layer is neither a powder nor a membrane, but is at a stage between the two. The cellulose acetate film or layer is microporous to a high degree and completely homogeneous, but very delicate. The film or layer is easily scraped off the plastic backing element thus distinguishing it from a cellulose acetate membrane coated plastic product like that sold by Millipore Corporation under the trademark Phoroslide where it is difficult to scrape or to remove the cellulose acetate from the plastic base. In the present invention the cellulose acetate layer is attached or bonded to the plastic support during the casting and forming operations without requiring bonding agents such as an adhesive which is required in Millipore support media sold under the trademark Phoroslide.

BRIEF DESCRIPTION OF THE DRAWING

FIG. 1 is a cross-sectional view through the cellulose acetate support medium.

FIG. 2 is a plan view of the apparatus or equipment used to make the cellulose acetate support medium.

FIG. 3 is an elevational view of the equipment or apparatus shown in FIG. 2.

FIG. 4 is an end view of the apparatus looking in the direction of arrow 4—4 of FIG. 3.

FIG. 5 is a fragmentary view, in section, taken on the line 5—5 of FIG. 3.

DESCRIPTION OF A PREFERRED EMBODIMENT

The microporous support medium or cellulose acetate plate is designated by the numeral 10 in FIG. 1 and consists of two layers. The backing element 12 forms one of the layers while the other layer 14 is composed of a low acetyl value cellulose acetate film. The backing element 12 may be made from rigid, semi-rigid, resilient or yieldable materials such as plastic, glass or aluminum. The cellulose acetate layer 14 is applied by a casting operation to one side of the backing element 12 by a method to be subsequently described and forms a relatively fragile or delicate homogeneous cellulose acetate film which adheres directly to the backing element 12. The cellulose acetate is applied to the backing element 12 in a solution and must have an average acetyl value of 20% to 44%. It has been found that the average acetyl value of the cellulose acetate within the range of 20% to 37% inclusive provides excellent properties and performance results. As previously noted, cellulose acetate with an acetyl value up to as high as 44% may be employed. I have found that with extended drying the higher acetyl value cellulose acetates will bond satisfactorily to the backing element.

The following examples illustrate typical procedures and formulations for preparing a suitable cellulose acetate solution:

EXAMPLE 1

A cellulose acetate solution is prepared by dissolving seven parts by weight of a 32% acetyl value cellulose acetate (Eastman 320) in 15 parts dioxane, 15 parts acetone, 38 parts ethyleneglycolmonoethyl ether and 25 parts ethylene glycol. The cellulose acetate resin utilized is dissolved in the active solvents consisting of acetone and dioxane and is suspended in the non-solvents consisting of the remaining specified ingredients. The resulting mix is blended for approximately 5 minutes at a low speed and remains in such state indefinitely and at least for a 60-minute period prior to casting.

EXAMPLE 2

A cellulose acetate solution is prepared by dissolving 3.7% by weight of a cellulose acetate (Eastman 320) having an acetyl value of 32% in active solvents including 13.3% by weight of acetone and 15.9% of dioxane.

Such solution is allowed to set at room temperature for 12 hours. A higher acetyl value cellulose of 39.4% (Eastman 394.60) is also used by taking 4.3% by weight and mixing same with the inactive solvents including 23.5% by weight of ethylene glycol, 39.09% by weight of ethylene glycol monoethyl ether and .3% by weight of Triton X100. The resulting mix is shaken by hand for 15 seconds and then poured into the active solvents containing the 32% acetyl value cellulose acetate. The resulting solution, having an average acetyl value of less than 37%, is then blended for 5 minutes at a low speed. The solution remains in the resulting state indefinitely and must set at least 60 minutes prior to use.

APPARATUS AND METHOD

The apparatus and equipment utilized in the present invention is illustrated in FIGS. 2–4 inclusive and includes a table or base 16 having a horizontally extending support or platform 18. A frame 20 is supported by the base 16 and includes a pair of transversely spaced horizontally extending rods 22, joined at their ends by cross braces 23, and vertical supporting struts 24, as illustrated in FIG. 3. The frame 20 forms a support for a plastic cover 26 which is adapted to close the sides and top of the frame 20, with the ends of the frame remaining open, and thereby form a tunnel or enclosure 28. The cover 26 is normally in a folded or raised position as is shown in FIG. 3, except during the forming operation as will be subsequently described.

A glass plate 30 is carried by the platform 18. The plate 30 has a length and width approximating the size of the platform 18. A drain trough 32 is connected to the platform 18 to permit excess solvents and water to run off from the glass plate 30. A high volume fan 34 is located near one end of the platform 18 directly opposite the entrance to tunnel 28. A roll 36 of plastic material is mounted on a support 38 beneath the platform 18.

In operation, the glass plate 30 is washed and cleaned prior to use. An elongated strip of plastic material from roll 32 is removed and is disposed over the length of the glass plate 30 and forms the backing element 12. It has been found that plastic sold under the trademark "Mylar" produces an excellent backing element. The backing element 12 may be of any suitable length or width. In actual operation a sheet or strip having a width of 24", a length of 204" and a thickness of .010" is used. After the plastic backing element 12 is rolled onto the glass plate 30, a sufficient quantity of water is poured over the entire length of the plastic strip or backing element 12 to remove impurities and dirt therefrom. Excess water is then removed from the plastic backing element 12 and is then wiped dry along the upper surface and the side edges thereof.

A conventional blade spreader 40 extending the width of the plastic backing element 12 is placed at one end thereof and a sufficient quantity of the cellulose acetate solution is placed therein. The spreader 40 is set as an example at .032". The spreader 40 is then rapidly pulled the entire length of the plastic backing element 14 by one workman to form a very thin film 14 of uniform thickness on the backing element 12. A second person turns on the fan 34 when the spreader 40 is approximately 4 feet away and then lowers the curtain 26 as soon as possible in order to form the enclosure or tunnel 28. The fan 34 forces a flow of air through the tunnel 28 across the cellulose acetate solution at a flow of approximately 500 to 2,000 cubic feet per minute. The blade spreader 40 is moved at the rate of 2 to 5 ft./second. As a result thereof the air flow removes certain of the solvents and the acetate is formed in a period of time from five to 25 minutes, depending on the solution utilized.

After the cellulose acetate film 14 is formed on the backing element 12, the resulting product is cut into shorter lengths or sheets. The sheets are then placed in cold water, temperature of 60° to 70° F., and allowed to soak for at least 12 hours in order to remove any water soluble material, especially the solvents which may remain. The sheets are then hung without support and allowed to air dry at room temperature. Thereafter the sheets are examined when dry, placed in uniform stacks and are then cut to the desired shapes.

There are several factors which aid in obtaining a good bond between the cellulose acetate film 14 and the backing element 12. The cellulose acetate must be formed very quickly. This is accomplished by forcing air rapidly over the spreaded mix surface at volumes up to 2,000 cu. ft. per minute. When a plastic material has been selected as the backing material rather than glass, aluminum, etc. it is also very beneficial to include a mild solvent such as dioxane in the cellulose acetate mix.

The cellulose acetate film 14 may be of any uniform thickness. The product 10 having a cellulose acetate film with a thickness of approximately .006" has produced excellent results. The resulting film 14 is homogeneous, relatively brittle and very delicate and is supported entirely by the backing element 12.

What I claim as my invention is:

1. A microporous support medium for use in the fields of zone electrophoresis, thin layer chromatography and like separation techniques comprising a relatively rigid backing element of a uniform thickness of approximately .010" having on one side thereof a homogeneous microporous cellulose acetate relatively brittle film of a uniform thickness of approximately .006" having an average acetyl value in the range of 20% to 37% inclusive adhering directly thereto and supported thereby.

2. The microporous support medium of claim 1, wherein said backing element is made from a plastic material.

3. The microporous support medium of claim 1, wherein said backing element is made from glass.

4. The microporous support medium of claim 1, wherein said backing element is made from aluminum.

5. The microporous support medium of claim 1, wherein said cellulose acetate is a hypergel cellulose acetate in a stage between a powder and a membrane and is capable of being readily scraped off said backing element, said cellulose acetate being adhered to said backing element by being cast directly thereto without bonding agents or adhesives.

6. A microporous support medium for use in the fields of zone electrophoresis, thin layer chromatography and like separation techniques comprising a backing element of uniform thickness having on one side thereof a homogeneous microporous cellulose acetate relatively brittle film of uniform thickness having an average acetyl value in the range of 20% to 44% inclusive adhering directly thereto and supported thereby.

7. The microporous support medium of claim 6, wherein said cellulose acetate is a hypergel cellulose acetate in a stage between a powder and a membrane and is capable of being readily scraped off said backing element.

8. The microporous support medium of claim 6, wherein said cellulose acetate is adhered to said backing element by being cast directly thereto without bonding agents or adhesives.

References Cited
UNITED STATES PATENTS

| | | | |
|---|---|---|---|
| 3,378,481 | 4/1968 | Saravis et al. | 204—299 |
| 3,479,265 | 11/1969 | Elevitch | 204—180 G |
| 3,482,943 | 12/1969 | Csizmas et al. | 204—299 X |
| 3,554,894 | 1/1971 | Zemel | 204—299 |
| 3,594,263 | 7/1971 | Dwyer et al. | 204—299 X |
| 3,635,808 | 1/1972 | Elevitch | 204—180 G |
| 3,691,054 | 9/1972 | Canley | 204—299 |

JOHN H. MACK, Primary Examiner

A. C. PRESCOTT, Assistant Examiner

U.S. Cl. X.R.

204—180 G, 180 S; 161—160; 106—196